United States Patent
Osuka et al.

(10) Patent No.: US 10,880,491 B2
(45) Date of Patent: Dec. 29, 2020

(54) IMAGING APPARATUS INCLUDING CONTROLLER FOR CONVERTING DYNAMIC RANGE IMAGE DATA

(71) Applicant: Panasonic Intellectual Property Management Co., Ltd., Osaka (JP)

(72) Inventors: Kyosuke Osuka, Osaka (JP); Tomoaki Tsutsumi, Osaka (JP); Takeshi Hamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/132,395

(22) Filed: Sep. 15, 2018

(65) Prior Publication Data

US 2020/0092456 A1    Mar. 19, 2020

(51) Int. Cl.
*H04N 5/235* (2006.01)
*H04N 5/202* (2006.01)
*H04N 5/232* (2006.01)

(52) U.S. Cl.
CPC .......... *H04N 5/2355* (2013.01); *H04N 5/202* (2013.01); *H04N 5/23245* (2013.01); *H04N 5/232933* (2018.08)

(58) Field of Classification Search
CPC ............. H04N 5/2355; H04N 5/23245; H04N 5/232933; H04N 5/202; H04N 5/355–3559; H04N 5/243; H04N 9/06; H04N 5/20; H04N 5/235; G06T 5/007–009; G06T 2207/20208
USPC .................................................. 348/333.01
See application file for complete search history.

(56) References Cited

U.S. PATENT DOCUMENTS

| | | | |
|---|---|---|---|
| 2016/0344990 A1* | 11/2016 | Kozuka | G06T 5/007 |
| 2017/0070681 A1* | 3/2017 | Nattress | G06F 3/1423 |
| 2018/0061026 A1* | 3/2018 | Kozuka | G06T 5/50 |
| 2018/0249182 A1* | 8/2018 | Andrivon | H04N 19/44 |
| 2019/0132643 A1* | 5/2019 | Walls | H04N 21/440218 |
| 2019/0246087 A1* | 8/2019 | Uesaka | H04N 5/2355 |

FOREIGN PATENT DOCUMENTS

| | | | | |
|---|---|---|---|---|
| JP | 2008-033930 A | 2/2008 | | |
| JP | 2017-073608 A | 4/2017 | | |
| JP | 2017073608 | * | 4/2017 | ............. H04N 5/225 |
| JP | 2017-139618 A | 8/2017 | | |

* cited by examiner

*Primary Examiner* — Lin Ye
*Assistant Examiner* — Chan T Nguyen
(74) *Attorney, Agent, or Firm* — Renner, Otto, Boisselle & Sklar, LLP

(57) ABSTRACT

An imaging apparatus includes an imaging part to capture a subject so as to generate image data, an image processor to generate first image data having a first dynamic range relating to brightness based on the image data, a display being not compatible with reproduction of the image having the first dynamic range but being compatible with reproduction of an image having a second dynamic range narrower than the first dynamic range, and a controller to control a display of an image indicated by the first image data. The controller has a first mode in which when the first image data is displayed on the display, the controller converts a color gamut of the first image data to a color gamut with which the display is compatible without converting a gamma characteristic of the first image data.

9 Claims, 9 Drawing Sheets

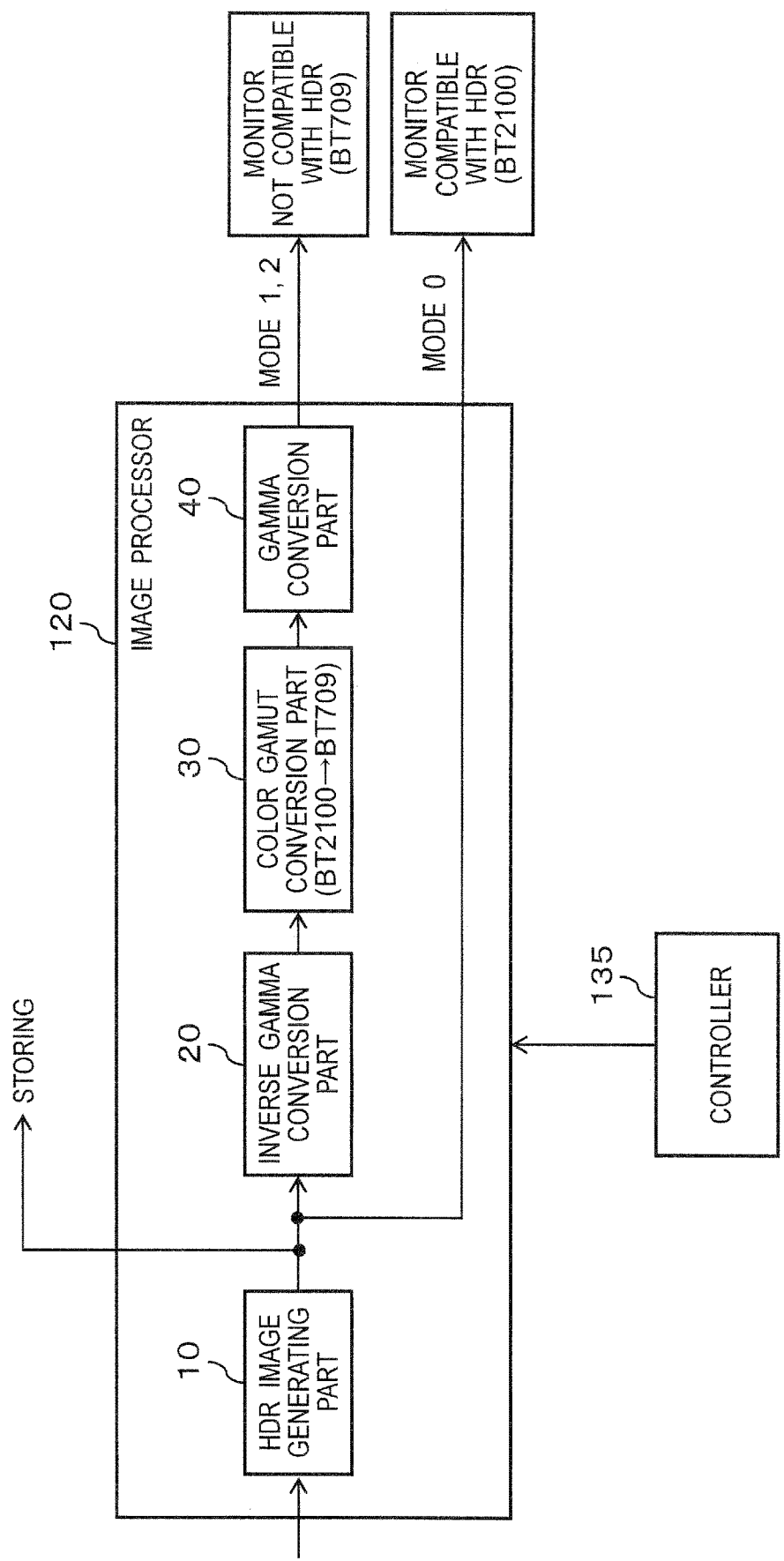

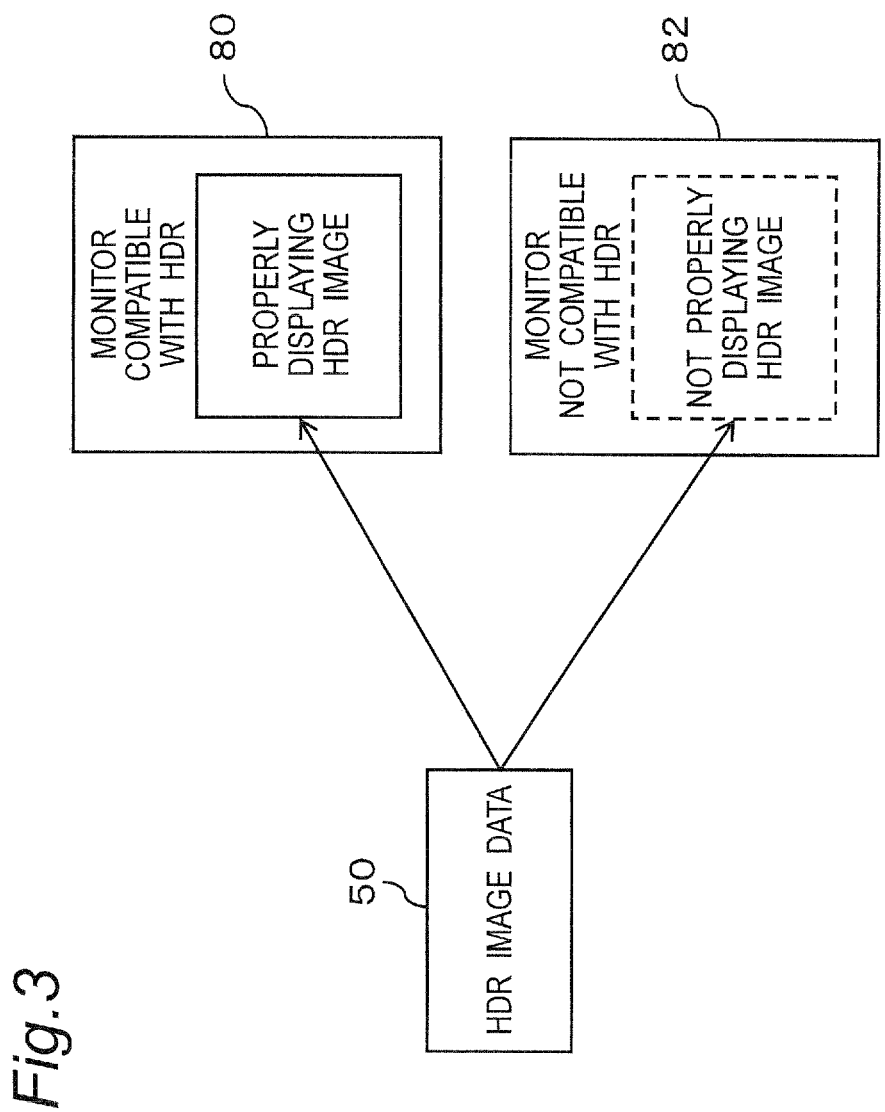

Fig.4

| MODE | CONVERSION PROCESSING | Gamut, Gamma | EFFECT |
|---|---|---|---|
| MODE 0 (ASSIST FUNCTION OFF) | NO COLOR CONVERSION NO BRIGHTNESS CONVERSION | Gamut:2100 Gamma:HDR | IMAGE HAVING DIFFERENT COLOR GAMUT FROM IMAGE TO BE ACTUALLY SCHEDULED TO BE CAPTURED DYNAMIC RANGE OF BRIGHTNESS IS RESTRICTED |
| MODE 1 | COLOR CONVERSION NO BRIGHTNESS CONVERSION | Gamut:709 Gamma:HDR | COLOR IS CLEAR PLACING HIGH IMPORTANCE ON EXPRESSION OF HIGH BRIGHTNESS |
| MODE 2 | COLOR CONVERSION BRIGHTNESS CONVERSION | Gamut:709 Gamma:SDR | COLOR IS CLEAR PLACING HIGH IMPORTANCE ON EXPRESSION OF INTERMEDIATE BRIGHTNESS |

IMAGING APPARATUS INCLUDING CONTROLLER FOR CONVERTING DYNAMIC RANGE IMAGE DATA

BACKGROUND

1. Technical Field

This disclosure relates to an imaging apparatus capable of capturing an image having a wide dynamic range in brightness.

2. Related Art

Recently, in an imaging apparatus, an imaging apparatus capable of capturing an image having a wide dynamic range in brightness (hereinafter referred to as "High Dynamic Range (HDR)") has been popularly used. In general, image data of an HDR image cannot be displayed on a display device which is not compatible with HDR.

Japanese Patent Application Publication No. 2017-73608 discloses an image processing device in which even with a display part which can only display an image signal having a small number of bits (for example, Standard Dynamic Range (SDR)), the whole gradation range of an image signal (HDR) having a large number of bits is confirmed. As such an image processing device, there is disclosed an image processing device which includes: a setting part which sets a gradation range; a gradation conversion part which converts a first image signal (HDR) where each pixel value is expressed by the first number of bits to a second image signal (SDR) where each pixel value is expressed by the second number of bits which is smaller than the first number of bits; and a display part which displays the second image signal. The gradation conversion part converts a pixel value of a first image signal (HDR) having a gradation range set by the setting part to a pixel value of a second image signal (SDR) in a dynamic range having the second number of bits. With such a configuration, a display part which can display only an image signal (SDR) having the small number of bits can also confirm the whole gradation range of an image signal having the large number of bits (HDR).

In capturing an image by the imaging apparatus, a user can confirm a state of color and brightness of an image scheduled to be captured by a live view image displayed on a monitor mounted on the imaging apparatus. In the case where the monitor is not compatible with HDR, the monitor cannot correctly display color and brightness of an HDR image so that the user cannot confirm the state of color and brightness of the HDR image scheduled to be captured.

SUMMARY

This disclosure provides an imaging apparatus which includes a display which is not compatible with an image having a wide dynamic range in brightness (for example, HDR image), and in which the state of color and brightness of an image scheduled to be captured having a wide dynamic range is visually confirmed.

An imaging apparatus according to a first aspect of this disclosure includes an imaging part to capture a subject so as to generate image data, an image processor to generate first image data having a first dynamic range relating to brightness based on the image data, a display being not compatible with reproduction of the image, having the first dynamic range but being compatible with reproduction of an image having a second dynamic range narrower than the first dynamic range, and a controller to control a display of an image indicated by the first image data. The controller has a first mode in which when the first image data is displayed on the display, the controller converts a color gamut of the first image data to a color gamut with which the display is compatible without converting a gamma characteristic of the first image data.

An imaging apparatus according to a second aspect of this disclosure includes an imaging part to capture a subject so as to generate image data, an image processor to generate first image data having a first dynamic range relating to brightness based on the image data, an output part to output the first image data to an external equipment which is not compatible with reproduction of an image having the first dynamic range but is compatible with reproduction of an image having a second dynamic range narrower than the first dynamic range, and a controller to control a characteristic of the first image data when the first image data is output to the external equipment. The controller has a first mode in which when the first image data is output to the external equipment, the controller converts a color gamut of the first image data to a color gamut with which the external equipment is compatible without converting a gamma characteristic of the first image data.

According to this disclosure, even when an imaging apparatus includes a display which is not compatible with an image having a wide dynamic range (for example, an HDR image), and in which a state of color and brightness of an image scheduled to be captured having a wide dynamic range is visually confirmed.

BRIEF DESCRIPTION OF DRAWINGS

FIG. 2 is a block diagram showing a configuration relating to a display function of displaying an HRD image by an image processor.

FIG. 3 is a view for describing a drawback in displaying an HDR image.

FIG. 4 is a view for describing conversion processing in respective display modes.

DETAILED DESCRIPTION OF THE EMBODIMENTS

Hereinafter, embodiments are described in detail with reference to drawings suitably. On the other hand, the detailed description more than necessary may be omitted. For example, the detailed description relating to well-known matters and the repeated description with respect to substantially the same configuration may be omitted. Such omission of the description is made so as to prevent the description made hereinafter from being unnecessarily redundant thus facilitating the understanding of this disclosure by those who are skilled in the art.

Inventor(s) provide accompanying drawings and the following description for enabling those who are skilled in the art to sufficiently understand this disclosure, and it is not intended that the accompanying drawings and the following description limit the subject matter described in claims.

First Embodiment

[1-1. Configuration]

Figure 1:
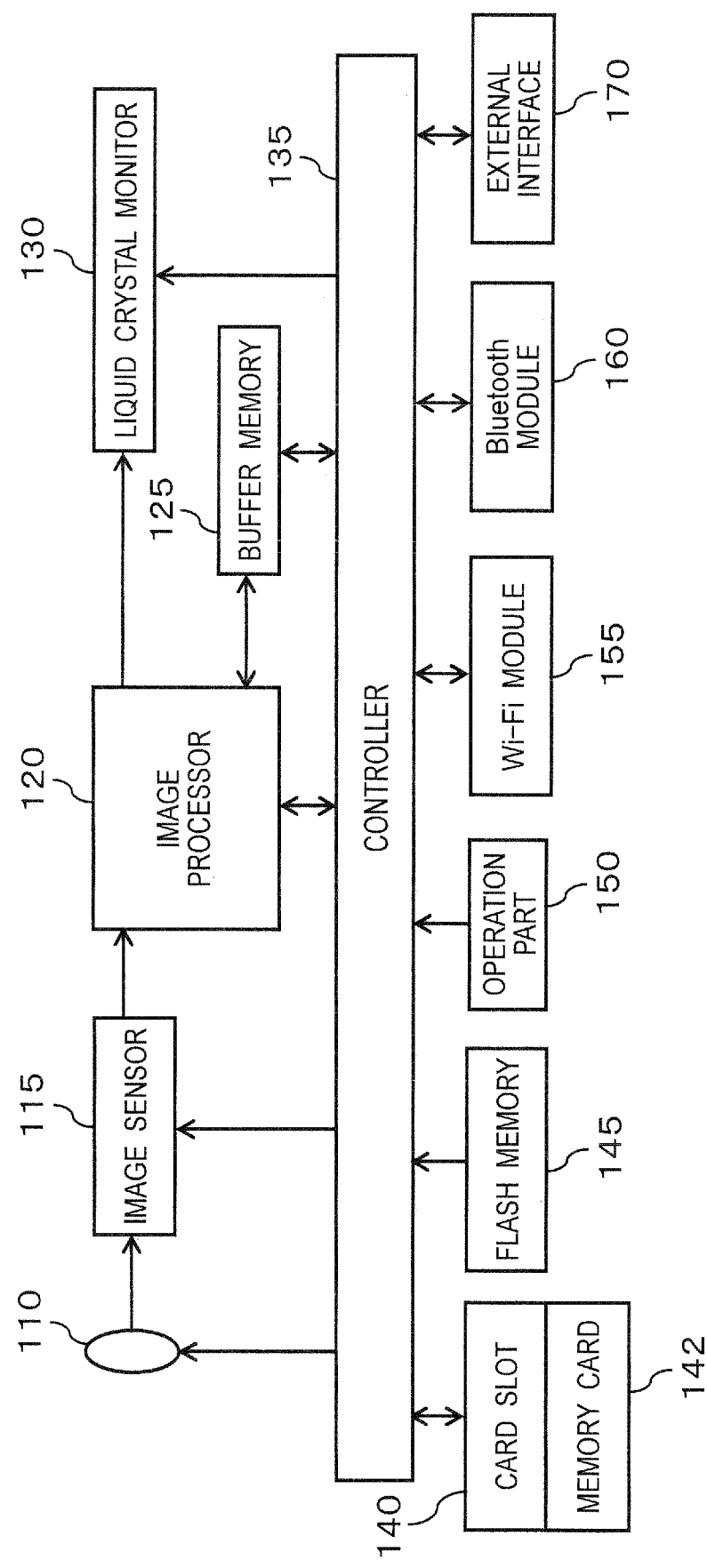
FIG. 1 is a block diagram showing a configuration of a digital camera according to an embodiment of this disclosure.

FIG. 1 is a view showing a configuration of a digital camera according to an embodiment of this disclosure. A digital camera 100 can capture a subject, generate image data, and can store the image data in a storage medium. Particularly, the digital camera 100 according to this embodiment has a function of capturing an HDR (High Dynamic Range) image having a wide dynamic range in brightness with respect to a still image or a moving image. Accordingly, the digital camera 100 has an HDR imaging mode which is a particular imaging mode for generating an HDR image.

The digital camera 100 captures a subject image formed through an optical system 110 by an image sensor 115, and generates image data. An image processor 120 generates image data by applying various processing to the captured image data generated by the image sensor 115. A controller 135 stores the image data generated by the image processor 120 in a memory card 142 mounted in a card slot 140. The controller 135 can also display (reproduce) the image data stored in the memory card 142 on a liquid crystal monitor 130 in response to an operation of an operation part 150 by a user.

The optical system 110 includes a focus lens, a zoom lens, an optical shake correction lens (OIS), a diaphragm, a shutter, and the like. The various lenses included in the optical system 110 may be of the desired number of lenses or may be formed of the desired number of groups of lenses.

The image sensor 115 captures a subject image formed through the optical system 110 and generates captured image data. The image sensor 115 generates image data of a new frame at a predetermined frame rate (for example, 30 frames/second). In the image sensor 115, generation timing of captured image data and an electronic shutter operation are controlled by the controller 135. As the image sensor 115, various kinds of image sensors such as a CMOS image sensor, a CCD image sensor, an NMOS image sensor can be used.

The image processor 120 generates image data by applying various processing to captured image data output from the image sensor 115. The image processor 120 generates an image to be displayed on the liquid crystal monitor 130 by applying various processing to the image data read out from the memory card 142. As the various processing, white balance correction, gamma correction, YC conversion processing, electronic zoom processing, compression processing, expansion processing and the like can be named. However, the various processing is not limited to these processing. The image processor 120 may be constituted of a hard-wired electronic circuit, or may be constituted of a microcomputer using a program, a processor, or the like. The detailed configuration of the image processor 120 is described later.

The liquid crystal monitor 130 is disposed on a back surface of the digital camera 100. The liquid crystal monitor 130 displays an image based on image data processed by the image processor 120. The liquid crystal monitor 130 is a monitor which is not compatible with an HDR image. That is, when an HDR image is displayed on the liquid crystal monitor 130 as it is, an image having a color gamut and brightness different from a color gamut and brightness which are originally obtained by the HDR image is displayed. Other monitors such as an organic EL monitor may be used in place of the liquid crystal monitor. The liquid crystal monitor 130 displays an image captured by the image sensor 115 in real time (live view display). A user can confirm a state of colors and brightness of an image scheduled to be captured by looking at the live view display and can determine the composition of an image.

The controller 135 includes a CPU and performs an integrated control of operations of the whole digital camera 100. The controller 135 may include a processor constituted of a dedicated electronic circuit which is designed to realize predetermined functions in place of the CPU. That is, the controller 135 can be realized by various processors such as a CPU, a MPU, a GPU, a DSU, an FPGA, ail ASIC, or the like. The controller 135 may be dedicated of a single processor or a plurality of processors. Further, the controller 135 may be dedicated of one semiconductor chip including the image processor 120 or the like. Although not shown in the drawings, the controller 135 incorporates a ROM therein. Various programs that the controller 135 executes are stored in the ROM. The controller 135 also incorporates an RAM (not shown in the drawing) which functions as an operation region of the CPU.

A buffer memory 125 is a storage medium which functions as a work memory of the image processor 120 and the controller 135. The buffer memory 125 is realized by a DRAM (Dynamic Random Access Memory) or the like.

The card slot 140 is a unit in which a detachable memory card 142 is inserted. The memory card 142 can be electrically and mechanically connectable to the card slot 140. The memory card 142 is an external memory which includes a storing element such as a flash memory or the like in the inside thereof. The memory card 142 can store data such as image data generated by the image processor 120.

The flash memory 145 is a nonvolatile storage medium.

The operation part 150 is a general term of a hard key such as operation buttons and operation levers exteriorly mounted on the digital camera 100 and receives operations from a user. The operation part 150 includes, for example, a release button, a mode dial, a touch panel, a jog dial, buttons, and slide switches. Upon reception of an operation from the user, the operation part 150 transmits an operation signal which corresponds to the user operation to the controller 135.

A Wi-Fi module 155 is a communication module (circuit) for performing the communication in accordance with the communication standard IEEE802.11 or the Wi-Fi standard. The digital camera 100 can communicate with other equipment on which a Wi-Fi module is mounted via the Wi-Fi module 155. The digital camera 100 may directly communicate with other equipment through the Wi-Fi module 155 or may communicate with other equipment via an access point.

A Bluetooth module 160 is a module (circuit) for performing communication in accordance with the communication standard 802.15.1, that is, the Bluetooth (registered trade mark) standard. The digital camera 100 can perform communication which conforms to the Bluetooth standard with other equipment via the Bluetooth module 160.

An external interface 170 is an interface which allows the controller 135 to perform data communication with external equipment. The external interface 170 includes a connector and a communication circuit which conform to the communication interface standard. The external interface 170 is, for example, an HDMI (High Definition Multimedia Interface) or a USB (Universal Serial Bus). The external equipment is, for example, a display, a monitor, a personal computer, or electronic equipment which includes a display.

FIG. 2 is a block diagram showing the configuration relating to HDR image processing in the image processor 120. The image processor 120 includes an HDR image generating part 10, an inverse gamma conversion part 20, a color gamut conversion part 30, and a gamma conversion part 40. The HDR image generating part 10 generates an HDR image in accordance with an HLG method upon reception of RAW data generated based on an image signal from the image sensor 115. The inverse gamma conversion part 20 converts a gamma characteristic (gamma characteristic of HDR) of the HDR image to a linear characteristic in accordance with a characteristic shown in FIG. 7 (described later). The HDR image has a gamma characteristic of BT2100. The color gamut conversion part 30 converts a color gamut of an image from a color gamut of BT2100 to a color gamut of BT709. The gamma conversion part 40 converts a gamma characteristic of an image from a linear characteristic to a gamma characteristic of HDR or a gamma characteristic of SDR in accordance with characteristics shown in FIG. 9 (described later).

In this disclosure, the digital camera 100 is one example of the imaging apparatus. The image sensor 115 is one example of an imaging part. The image processor 120 is one example of an image processor. The controller 135 is one example of a control part. The liquid crystal monitor 130 is one example of a display. The card slot 140 is one example of a storage part. The memory card 142 is one example of a storage medium. A mode 1 is one example of a first mode and a mode 2 is one example of a second mode. The HDR image data is one example of the first image data.

[1-2. Operation]

An image capturing operation in the digital camera 100 having the above-mentioned configuration is described hereinafter.

[1-2-1. Assist Function]

As described previously, the digital camera 100 according to this embodiment can capture an HDR image. Various formats are known as an HDR method. In this embodiment, a Hybrid Log-Gamma (HLG) method is adopted as a format of HDR. However, other methods (for example, Perceptual Quantization (PQ) method) may be adopted.

The liquid crystal monitor 130 of the digital camera 100 is not compatible with HDR, that is, the HLG method, and it is assumed that an image method displays 1080/60/I or 1080/60/P (hereinafter, the display of this type being expressed as "the liquid crystal monitor 130 which is not compatible with HDR"). The mode 1 and the mode 2 described later are provided on a premise of the above-mentioned type of liquid crystal monitor 130.

As shown in FIG. 3, an HDR image 50 can be properly reproduced (displayed) by a reproducing device 80 (for example, a monitor, a television, a personal computer) having a function of reproducing an image which is compatible with HDR. However, in the case where a reproducing device is not compatible with HDR and is compatible with only the conventional Standard Dynamic Range (SDR), the reproducing device 82 cannot properly reproduce an HDR image. For example, in the case where a monitor mounted on an imaging apparatus is not compatible with HDR and an image form is 1080/60/I or 1080/60/P, when the HDR image captured by the imaging apparatus is displayed as a live view display on a monitor, an image having a color gamut and brightness which are originally obtained from the HDR image is not displayed on the monitor. To be more specific, brightness of the image to be displayed becomes slightly darker, and color of the image also becomes color different from original color. Accordingly, a user cannot accurately recognize a color gamut and brightness of an image which is actually captured even when the user references such a live view image. That is, the user cannot accurately recognize a color gamut and brightness of an HDR image scheduled to be captured from the live view image.

Accordingly, the digital camera 100 according to this embodiment has an assist function capable of displaying an image having color and brightness close to color and brightness originally obtained by an HDR image by conversion when the HDR image is displayed as a live view display in the liquid crystal monitor 130. By making use of such an assist function, a user can recognize a color gamut and brightness of an actually captured image when the user references the live view image. When the assist function is set to an ON state, a display mode of the liquid crystal monitor 130 is switched to a particular display mode. FIG. 4 is a view for describing display modes switched by the assist function.

When the assist function is set to an ON state, the display mode is switched to the "mode 1" or the "mode 2". The display mode when the assist function is set to an OFF state is assumed as a "mode 0". Switching of the assist function to an ON/OFF state and switching of the modes 1, 2 are performed via an operation part 150.

In the mode 1, although the color gamut of the captured HDR image is converted, a gamma characteristic, that is, brightness is not converted. To be more specific, in the mode 1, the color gamut of the HDR image is converted from BT2100 to BT709. In the case where the image converted in the mode 1 is displayed on the liquid crystal monitor 130 which is not compatible with HDR, color in the BT709 color gamut is displayed with favorable reproducibility. Although the image becomes a dark image as a whole, a portion having a high brightness gradation is displayed without halation. Accordingly, the mode 1 is effective in confirmation of a state of color and brightness having a high brightness gradation in an image to be captured.

In the mode 2, a color gamut of an HDR image and a gamma characteristic of the image, that is, brightness are converted. To be more specific, in the mode 2, a color gamut of the image is converted from BT2100 to BT709 in the same manner as the mode 1. Further, a gamma characteristic of the input image is also converted to a gamma characteristic of SDR. In the case where the image converted in the mode 2 is displayed on the liquid crystal monitor 130 which is not compatible with HDR, color in a BT709 color gamut is displayed with favorable reproducibility. Although a portion of the image having a high brightness gradation is matted by halation, portions of the image ranging from the portion having low brightness to the portion having an intermediate gradation are clearly displayed. Accordingly, the mode 2 is effective in the confirmation of a state of colors and brightness of portions of an image to be captured ranging from the portion having low brightness to the portion having an intermediate gradation.

In the mode 0, neither a color gamut nor a gamma characteristic of an HDR image is converted. In the mode 0, in the case where a captured HDR image is displayed by the liquid crystal monitor 130 which is not compatible with HDR, an image having a different color gamut from an image to be actually scheduled to be captured is displayed. Further, an image where a dynamic range of brightness is restricted is displayed.

Figure 5:
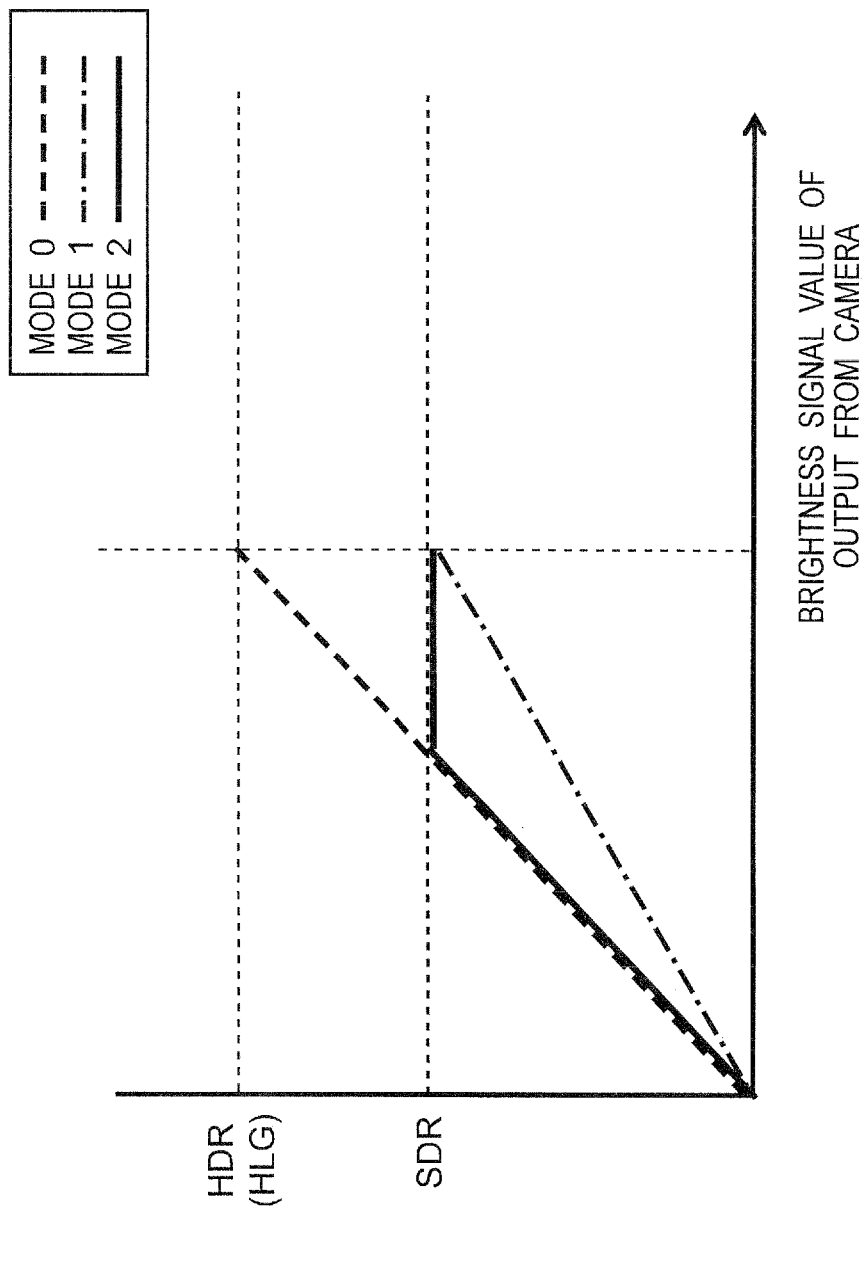
FIG. 5 is a view for conceptually describing the conversion of a gamma characteristic in the respective display modes.

FIG. 5 is a view for conceptually describing the conversion of a gamma characteristic in the respective display modes. In FIG. 5, a brightness signal value of an output from the digital camera 100 is taken on a horizontal axis, and a brightness value of the display is taken on a vertical axis That is, in the mode 1 (chain line) or the mode 2 (solid line), a maximum value of brightness is set to a low value compared to the mode 0 (broken line). Further, when the mode 1 is compared to the mode 2, in the mode 2, brightness is limited by an upper limit value with respect to a gradation having a fixed value or more in a high brightness region, while in the mode 1, conversion is performed without restriction in the whole region. The mode 1 is a mode for placing high importance on the gradation expression of a high brightness part, and is a mode for professionals or high armatures. The mode 2 is a mode for placing high importance on the gradation expression of an intermediate brightness part, and is a mode for ordinary armatures. It is often the case that the ordinary armatures confirm the exposure by looking at a subject having intermediate brightness such as a face.

[1-2-2. Live View Display Operation]

Figure 6:
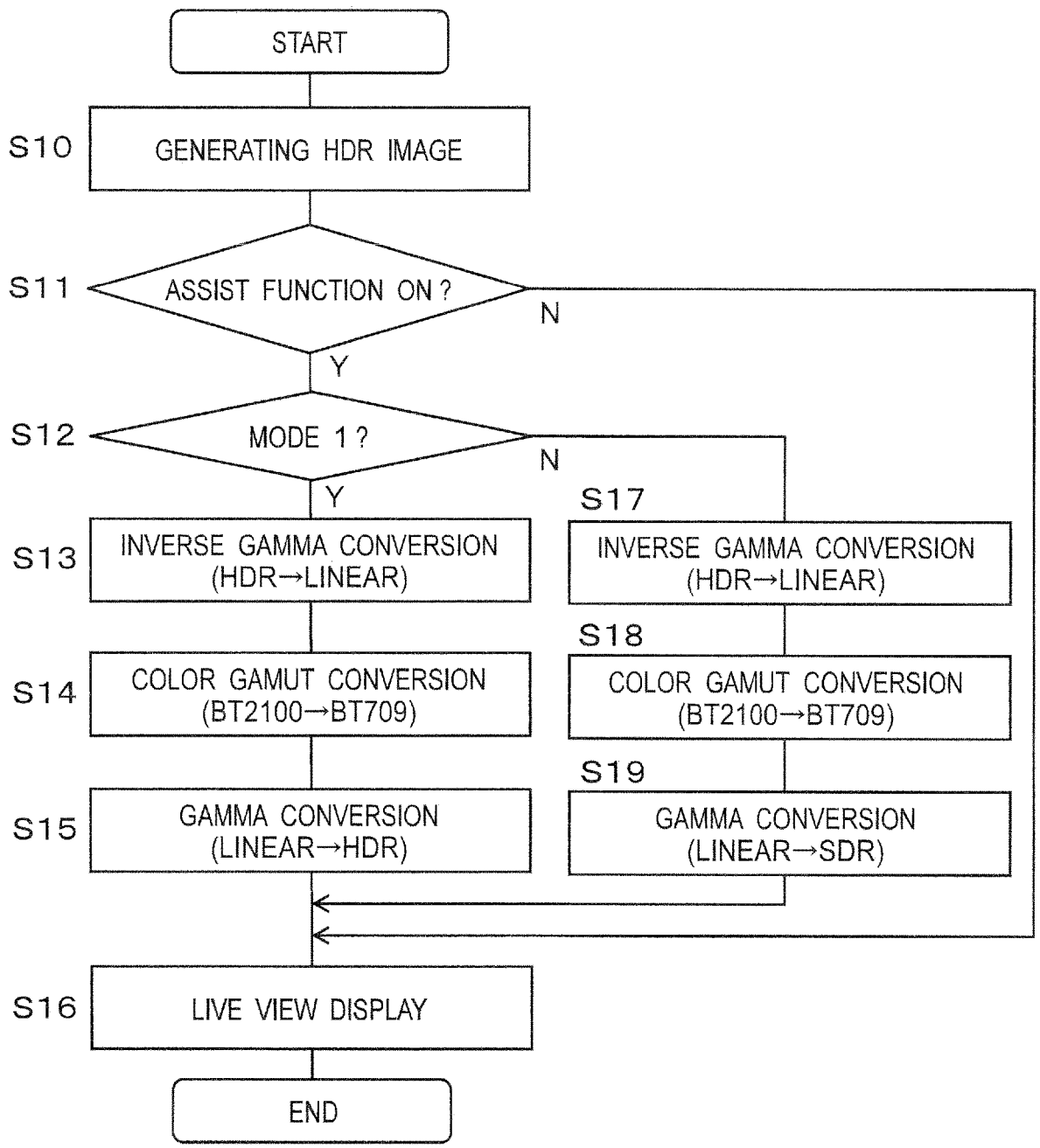
FIG. 6 is a flowchart showing live view display processing in an HER image in the digital camera.

FIG. 6 is a flowchart showing live view display processing in an HDR imaging mode in the digital camera 100. This processing is performed by the controller 135 and the image processor 120.

The controller 135 controls the image sensor 115, captures an image, generates RAW data, and generates HDR image data from RAW data by controlling the image processor 120 (S10).

Next, the controller 135 confirms whether or not an assist function is in an ON state (S11). When the assist function is in an OFF state (NO in S11), the controller 135 displays an HDR image on the liquid crystal monitor 130 as it is without converting the HDR image (S16). When the assist function is in an ON state (YES in S11), the controller 135 controls the image processor 120 such that the image processor 120 performs the conversion of a color gamut and brightness of the HDR image in accordance with a mode (S12 to S15, S17 to S19).

Figure 7:
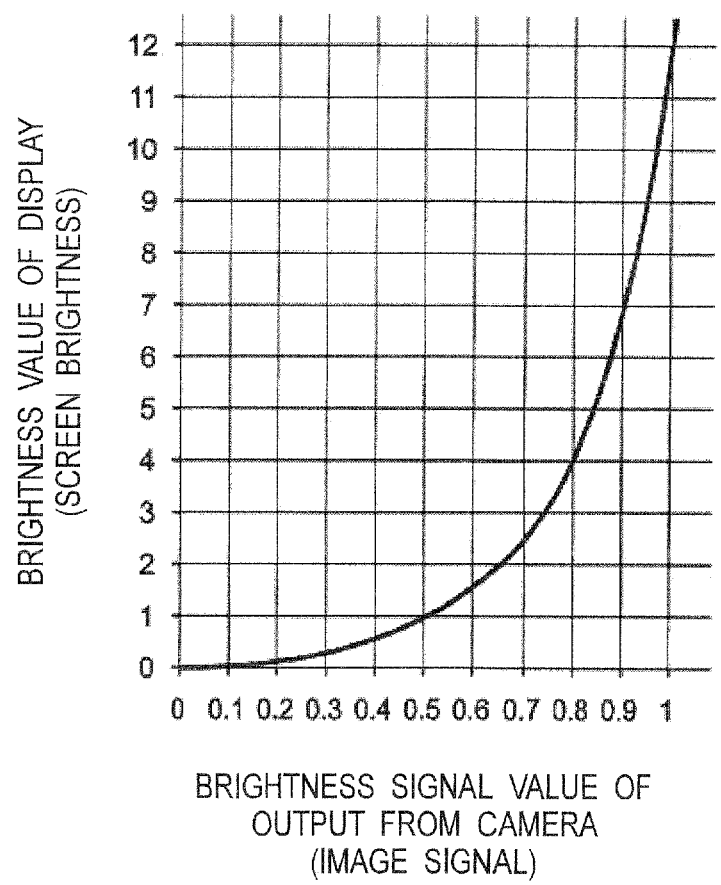
FIG. 7 is a view showing an inverse gamma characteristic used in inverse gamma conversion performed by the image processor.

To be more specific, when the display mode is set to the mode 1 (YES in S12), the inverse gamma conversion part 20 of the image processor 120 performs inverse gamma conversion on HDR image data in accordance with a characteristic shown in FIG. 7, thus converting a gamma characteristic from a gamma characteristic of HDR to a linear characteristic (S13).

Figure 8:
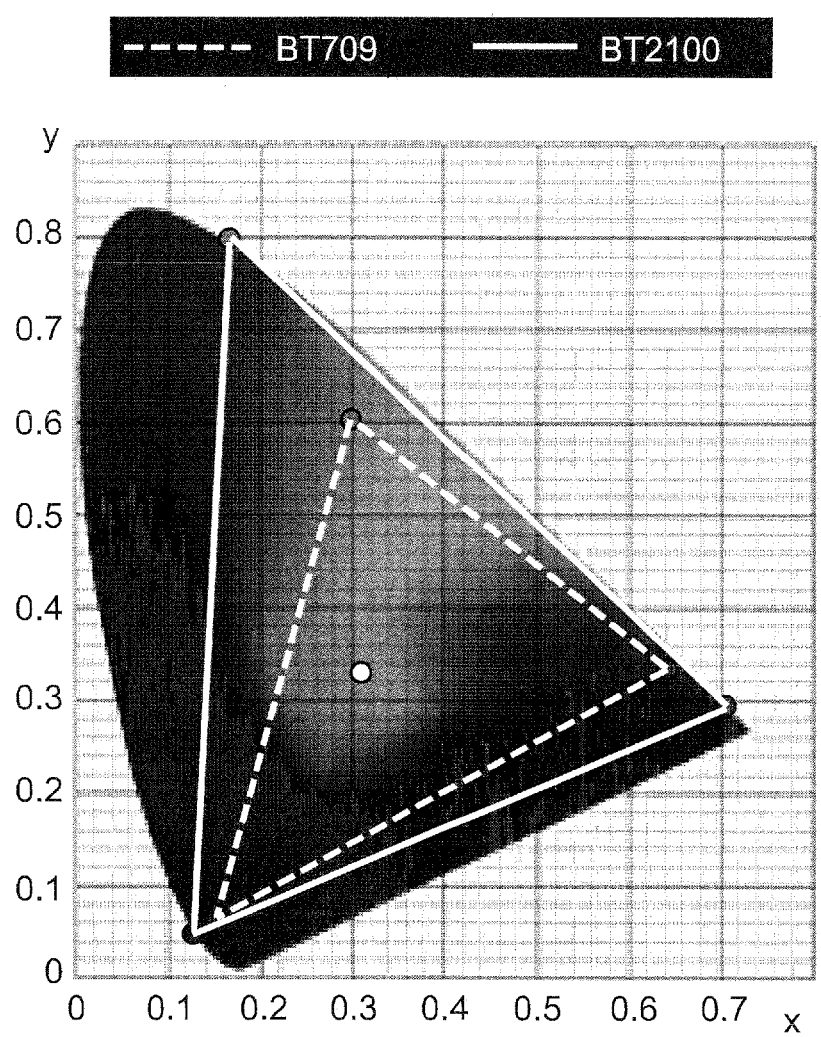
FIG. 8 is a view for describing respective color gamuts of BT2100 and BT709.

Next, the color gamut conversion part 30 converts a color gamut from the color gamut of BT2100 to the color gamut of BT709 with respect to the image data on which inverse gamma conversion is performed by the inverse gamma conversion part 20 (S14). FIG. 8 is a view for describing respective color gamuts of BT2100 and BT709. As shown in FIG. 8, the color gamut of BT2100 is wider than the color gamut of BT709. The color gamut of the HDR image data is BT2100. The liquid crystal monitor 130 which is not compatible with HDR has the color gamut of BT709. Accordingly, by converting the color gamut of BT2100 to the color gamut of BT709, on the liquid crystal monitor 130 which is not compatible with HDR, it is possible to perform a display with clear colors in a live view display based on the HDR image data. The following shows a conversion matrix for converting the color gamut from the color gamut of BT2100 to the color gamut of BT709.

$$\begin{pmatrix} R_{709} \\ G_{709} \\ B_{709} \end{pmatrix} = \begin{pmatrix} 1.6605 & -0.5876 & -0.0729 \\ -0.1245 & 1.1328 & -0.0084 \\ -0.0181 & -0.1006 & 1.1188 \end{pmatrix} \begin{pmatrix} R_{2100} \\ G_{2100} \\ B_{2100} \end{pmatrix}$$

Figure 9:
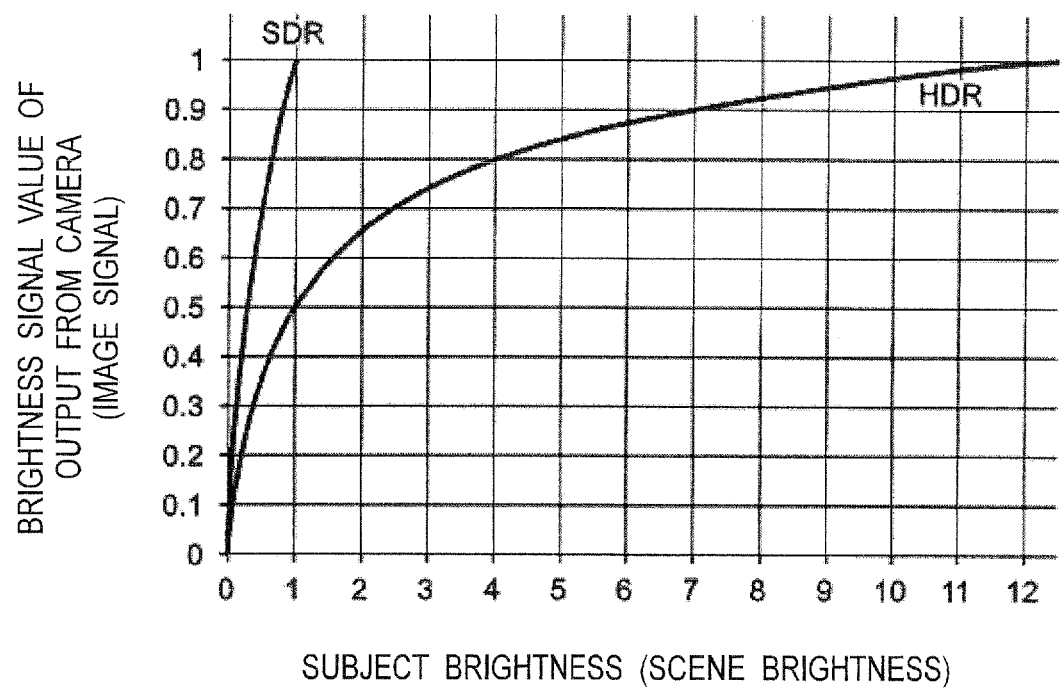
FIG. 9 is a view showing a gamma characteristic with respect to SDR and HDR used in gamma conversion performed by the image processor.

As a final step, the gamma conversion part 40 converts the gamma characteristic from the linear characteristic to the characteristic of HDR in accordance with a characteristic shown in FIG. 9 with respect to the image data where the color gamut is converted by the color gamut conversion part 30 (S15). That is, in this case, the gamma characteristic is returned to the same characteristic as the original HDR image.

In a live view display, the controller 135 causes the liquid crystal monitor 130 to display the image data where the color gamut is converted as described above (S16). As a result, in the mode 1, in a live view display, an image where colors in the BT709 color gamut have favorable reproducibility and a high brightness gradation is maintained is displayed.

On the other hand, when, the display mode is set to the mode 2 (NO in S12), the inverse gamma conversion part 20 of the image processor 120 performs inverse gamma conversion on HDR image data, thus converting a gamma characteristic from a gamma characteristic of HDR to a linear characteristic (S17).

Next, the color gamut conversion part 30 converts the color gamut from the color gamut of BT2100 to the color gamut of BT709 with respect to the image data on which inverse gamma conversion is performed by the inverse gamma conversion part 20 (S18).

As a final step, the gamma conversion part 40 converts the gamma characteristic from the linear characteristic to the gamma characteristic of SDR in accordance with a characteristic shown in FIG. 9 with respect to the image data in which the color gamut is converted by the color gamut conversion part 30 (S19).

In a live view display, the controller causes the liquid crystal monitor 130 to display the image data where the color gamut and the brightness are converted as described above (S16). As a result, in the mode 2, in a live view display, an image where colors in the BT709 color gamut have favorable reproducibility and a clear gradation is obtained from low brightness to intermediate brightness is displayed.

[1-3. Advantageous Effects and the Like]

As has been described above, the digital camera 100 according to this embodiment includes the image sensor 115 which captures a subject and generates image data, the image processor 120 which generates HDR image data having a wide dynamic range relating to brightness based on the image data, the liquid crystal monitor 130 which is not compatible with reproduction of an image having a wide dynamic range (HDR) but is compatible with the reproduction of an image having a narrow dynamic range (SDR), and the controller 135 which controls a display of an image indicated by the HDR image data. The controller 135 has the mode 1 in which when HDR image data is displayed on the liquid crystal monitor 130, the controller 135 converts a color gamut (for example, BT2100) of the HDR image data to a color gamut (for example, BT709) with which the liquid crystal monitor 130 is compatible without converting a gamma characteristic of the HDR image data.

When the HDR image data is displayed on the liquid crystal monitor 130, the color gamut of the HDR image data is converted to the color gamut with which the liquid crystal monitor 130 is compatible in the mode 1, and hence, colors substantially equal to colors of an image which is actually captured are displayed on the liquid crystal monitor 130. Accordingly, a user can recognize colors of an image scheduled to be captured actually by referencing a live view display. Further, in the mode 1, a gamma characteristic is not converted and hence, brightness close to brightness of an image to be captured actually is displayed with respect to a high brightness gradation. Accordingly, the user can recognize brightness of an image scheduled to be captured actually with respect to the high brightness gradation by referencing a live view display.

Further, the digital camera 100 may have the mode 2. In the mode 2, when the HDR image data is displayed on the liquid crystal monitor 130, the digital camera 100 converts the color gamut (for example, BT2100) of the HDR image data to the color gamut (for example, BT709) with which the liquid crystal monitor 130 is compatible, and converts a gamma characteristic of the HDR image data to a gamma characteristic with which the liquid crystal monitor 130 is compatible.

When the HDR image data is displayed on the liquid crystal monitor 130, the color gamut of the HDR image data is converted to the color gamut with which the liquid crystal monitor 130 is compatible in the mode 2, and hence, colors substantially equal to colors of an image which is actually captured are displayed on the liquid crystal monitor 130. Accordingly, a user can recognize colors of an image to be captured actually by referencing a live view display. Further, in the mode 2, a gamma characteristic of the HDR image data is converted to the gamma characteristic with which the liquid crystal monitor 130 is compatible and hence, brightness close to brightness of an image to be captured actually is expressed on the liquid crystal monitor 130 with respect to an intermediate brightness gradation. Accordingly, the user can recognize brightness of the image to be captured actually with respect to the intermediate brightness gradation by referencing a live view display.

OTHER EMBODIMENTS

As has been described heretofore, the first embodiment has been described as an example of a technique disclosed in this application. However, the technique of this disclosure is not limited to the first embodiment, and is applicable to embodiments in which a change, a replacement, an addition, an omission, and the like are suitably made with respect to the first embodiment. Further, new embodiments may be conceivable by combining the constitutional elements described in the first embodiment.

In the above-mentioned embodiment, the conversion of a color gamut is performed in the above-mentioned modes 1, 2 in the case where the liquid crystal monitor 130 of the digital camera 100 is not compatible with HDR, and an image form of the liquid crystal monitor 130 is 1080/60/I or 1080/60/P. However, in the case where the liquid crystal monitor 130 is not compatible with HDR, and the image form is any one of 2160/60/P, 2160/120/P, 4320/60/P, and 4320/120/P, colorimetry (color conversion) does not use BT 709 but uses BT2020 (that is, 2T2100). Accordingly, it is unnecessary to use the conversion of a color gamut in the above-mentioned modes 1, 2. In this case, in the mode 1 and the mode 2, "conversion of the color gamut of the first image data to the color gamut with which the display is compatible" includes the above-mentioned case where conversion processing is actually performed to the color gamut in conformity with a type of the display (that is, performing the conversion processing in the color gamut conversion part 30 shown in FIG. 2) and the case where conversion processing is not performed (that is, conversion processing in the color gamut conversion part 30 shown in FIG. 2 being not performed or ignored).

In the above-mentioned embodiment, the description has been made with respect to conversion processing of a color gamut and a brightness of an HDR image in a live view display on a liquid crystal monitor display. The above-mentioned conversion processing is also applicable to a live view display on a view finder in the case where the digital camera includes the view finder in addition to the liquid crystal monitor or in place of the liquid crystal monitor.

Further, in the case where HDR image data is output via an external interface 170 which outputs the image data to external equipment, the above-mentioned conversion processing relating to a color gamut and brightness may be applied to the HDR image data. That is, in the case where electronic equipment connected via the external interface 170 is not compatible with the HDR image, the HDR image data may be converted in the mode 1 or the mode 2 and, thereafter, the HDR image data may be output to the electronic equipment via the external interface 170.

That is, the digital camera 100 may include the image sensor 115 which captures a subject and generates image data, the image processor 120 which generates HDR image data having a wide dynamic range (HDR) relating to brightness based on the image data, the external interface 170 (one example of an output part) which outputs the HDR image data to the external equipment which is not compatible with the reproduction of an image having a wide dynamic range but is compatible with the reproduction of an image having a narrow dynamic range (SDR), and the controller 135 which controls a characteristic of the HDR image data when the HDR image data is output to the external equipment. The controller 135 may have the mode 1 in which when the HDR image data is output to the external equipment, the controller 135 converts the color gamut of the HDR image data to the color gamut with which the external equipment is compatible without converting a gamma characteristic of the HDR image data. The digital camera 100 may further include the mode 2 in which a gamma characteristic of the HDR image data output to the external equipment via the external interface 170 is converted in addition to the color gamut.

With such a configuration, even when the external equipment connected to the external interface 170 is not compatible with HDR, a user can recognize in advance color and brightness of an image to be captured in an HDR imaging mode.

Further, by acquiring a type of a display of the external equipment by HDMI communication, as described previously, the conversion of a color gamut may be performed in the above-mentioned mode 1 or mode 2 even in the case where the type of the display of the external equipment is not compatible with HDR, and an image form of the display of the external equipment is 1080/60/I or 1080/60/P. Further, the conversion of a color gamut may not be performed in the above-mentioned mode 1 or mode 2 in the case where the type of the display of the external equipment is not compatible with HDR, and an image form of the display of the external equipment is any one of 2160/60/P, 2160/120/P, 4320/60/P, and 4320/120/P. In this case, in the mode 1 and the mode 2, "conversion of the color gamut of the first image data to the color gamut with which the display is compatible" includes the case where conversion processing is actually performed to the color gamut (that is, conversion processing of the color gamut conversion part 30 is performed as shown in FIG. 2) according to the type of the display as described above, and the case where conversion processing is not performed to the color gamut (that is, the conversion processing of the color gamut conversion part 30 shown in FIG. 2 is not performed and is ignored).

Although the description has been made by exemplifying the digital camera as an example of the imaging apparatus, the imaging apparatus is not limited to the digital camera. The imaging apparatus may be electronic equipment capable of capturing an HDR image (for example, a video camera, a smartphone, a tablet terminal, or the like).

As has been described above heretofore, the technique of this disclosure is exemplified in the form of the embodiment. Accordingly, the attached drawings and the detailed description of the embodiment are provided.

Accordingly, there is a possibility that the elements described in the attached drawings and the detailed description of the embodiment may include not only elements indispensable for overcoming the drawbacks but also elements which are not indispensable for overcoming the drawbacks for exemplifying the above-mentioned technique. Accordingly, it should not be ascertained that these elements which are not indispensable are indispensable based on the fact that these elements which are not indispensable are described in the attached drawings and the detailed description of embodiment.

The above-mentioned embodiment is provided for exemplifying the technique of this disclosure and hence, various modifications, replacements, additions, omissions, and the like can be performed within the scope of claims or the scope considered equivalent to the scope of Claims.

INDUSTRIAL APPLICABILITY

This disclosure is useful in an imaging apparatus having a function of capturing an image in a dynamic range having wide brightness (HDR).

What is claimed is:

1. An imaging apparatus comprising:
    an imaging part to capture a subject so as to generate image data;
    an image processor to generate first image data having a first dynamic range relating to brightness based on the image data;
    a display being not compatible with reproduction of the image having the first dynamic range but being compatible with reproduction of an image having a second dynamic range narrower than the first dynamic range; and
    a controller to control a display of an image indicated by the first image data, the controller having a first mode in which when the first image data is displayed on the display, the controller converts a color gamut of the first image data to a color gamut with which the display is compatible without converting a gamma characteristic of the first image data, and having a second mode in which when the first image data is displayed on the display, the controller converts the color gamut of the first image data to a color gamut with which the display is compatible and converts the gamma characteristic of the first image data to a gamma characteristic with which the display is compatible,
    wherein when the first image data is displayed in the second mode, which is converted to the gamma characteristic with which the display is compatible on the display, a characteristic of the brightness value of the display device with respect to the brightness signal value of the imaging apparatus output includes:
        a first area from a low brightness area to an intermediate brightness area in which a brightness is obtained in a whole range where the display can display, and the brightness is the same as brightness obtained in displaying the first image data on a display that has the first dynamic range, and
        a second area in which a maximum luminance that can be displayed by the display is obtained, the second area being a high-luminance area continuing from the first area.

2. The imaging apparatus according to claim 1, further comprising an operation part to set the first mode or the second mode.

3. The imaging apparatus according to claim 1, wherein the display displays the first image data processed in accordance with the first mode or the second mode in a live view display.

4. The imaging apparatus according to claim 1, wherein the controller converts the color gamut of the first image data from a color gamut of BT2100 to a color gamut of BT709 in the first mode.

5. The imaging apparatus according to claim 1, wherein the first image data is an image stored in accordance with a Hybrid Log-Gamma method.

6. An imaging apparatus comprising:
    an imaging part to capture a subject so as to generate image data;
    an image processor to generate first image data having a first dynamic range relating to brightness based on the image data;
    an output part to output the first image data to an external equipment which is not compatible with reproduction of an image having the first dynamic range but is compatible with reproduction of an image having a second dynamic range narrower than the first dynamic range; and
    a controller to control a characteristic of the first image data when the first image data is output to the external equipment, the controller having a first mode in which when the first image data is output to the external equipment, the controller converts a color gamut of the first image data to a color gamut with which the external equipment is compatible without converting a gamma characteristic of the first image data, and having a second mode in which when the first image data is output to the external equipment, the controller converts the color gamut of the first image data to a color gamut with which the external equipment is compatible and converts the gamma characteristic of the first image data to a gamma characteristic with which the external equipment is compatible,
    wherein when the first image data is output in the second mode, which is converted to the gamma characteristic with which the external equipment is compatible, a characteristic of the brightness value of the external equipment with respect to the brightness signal value of the imaging apparatus output includes:
        a first area from a low brightness area to an intermediate brightness area in which a brightness is obtained in a whole range in which the external equipment is compatible, and the brightness is the same as a brightness obtained on an external equipment that has the first dynamic range, and
        a second area in which a maximum luminance that can be displayed by the external equipment is obtained, the second area being a high-luminance area continuing from the first area.

7. The imaging apparatus according to claim 6, further comprising an operation part to set the first mode or the second mode.

8. The imaging apparatus according to claim 6, wherein the controller converts the color gamut of the first image data from a color gamut of BT2100 to a color gamut of BT709 in the first mode.

9. The imaging apparatus according to claim 6, wherein the first image data is an image stored in accordance with Hybrid Log-Gamma method.

\* \* \* \* \*